(12) United States Patent
Moll et al.

(10) Patent No.: US 7,533,242 B1
(45) Date of Patent: May 12, 2009

(54) PREFETCH HARDWARE EFFICIENCY VIA PREFETCH HINT INSTRUCTIONS

(75) Inventors: Laurent R. Moll, San Jose, CA (US);
Jorel D. Hartman, San Jose, CA (US);
Peter N. Glaskowsky, Cupertino, CA (US); Seungyoon Peter Song, East Palo Alto, CA (US); John Gregory Favor, Scotts Valley, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 377 days.

(21) Appl. No.: 11/279,880

(22) Filed: Apr. 15, 2006

Related U.S. Application Data (63) Continuation-in-part of application No. 11/351,058, filed on Feb. 9, 2006, now Pat. No. 7,412,570.

(60) Provisional application No. 60/731,969, filed on Oct. 31, 2005, provisional application No. 60/743,560, filed on Mar. 20, 2006, provisional application No. 60/744,592, filed on Apr. 10, 2006.

(51) Int. Cl.
*G06F 9/26* (2006.01)

(52) U.S. Cl. ........................ 711/213; 711/214

(58) Field of Classification Search ............ None
See application file for complete search history.

(56) References Cited

U.S. PATENT DOCUMENTS 7,260,704 B2 * 8/2007 Cooksey et al. ............ 711/213

* cited by examiner

*Primary Examiner*—Hyung S Sough
*Assistant Examiner*—Ngoc V Dinh
(74) *Attorney, Agent, or Firm*—Osha • Liang LLP (57) ABSTRACT

A software agent assembles prefetch hint instructions or prefixes defined in an instruction set architecture, the instructions/prefixes conveying prefetch hint information to a processor enabled to execute instructions according to the instruction set architecture. The prefetch hints are directed to control operation of one or more hardware memory prefetcher units included in the processor, providing for increased efficiency in memory prefetching operations. The hints may optionally provide any combination of parameters describing a memory reference traffic pattern to search for, when to begin searching, when to terminate prefetching, and how aggressively to prefetch. Thus the hardware prefetchers are enabled to make improved traffic prediction, providing more accurate results using reduced hardware resources. The hints may include any combination of specific pattern hints (one/two/N-dimensional strides, indirect, and indirect-stride), modifiers including sparse and region, and a prefetch-stop directive. The parameters may include any combination of a count, a priority and a ramp.

22 Claims, 4 Drawing Sheets

PREFETCH HARDWARE EFFICIENCY VIA PREFETCH HINT INSTRUCTIONS

CROSS REFERENCE TO RELATED APPLICATIONS

Priority benefit claims for this application are made in the accompanying Application Data Sheet (if any). To the extent permitted by the type of the instant application, this application incorporates by reference for all purposes the following applications, which are all owned by the owner of the instant application:

U.S. Provisional Application Ser. No. 60/731,969, filed Oct. 31, 2005, by Laurent R. Moll, et al.; and entitled INSTRUCTIONS GIVING HINTS TO THE HARDWARE PREFETCHER FOR MORE EFFICIENT PREDICTION OF PREFETCHES;

U.S. Provisional Application Ser. No. 60/743,560, filed Mar. 20, 2006, by Laurent R. Moll, et al.; and entitled IMPROVED PREFETCH HARDWARE EFFICIENCY VIA PREFETCH HINT INSTRUCTIONS;

U.S. Provisional Application Ser. No. 60/744,592, filed Apr. 10, 2006, by Laurent R. Moll, et al.; and entitled IMPROVED PREFETCH HARDWARE EFFICIENCY VIA PREFETCH HINT INSTRUCTIONS; and U.S. Non-Provisional application Ser. No. 11/351,058, filed Feb. 9, 2006, by Laurent R. Moll, et al.; and entitled A SMALL AND POWER EFFICIENT CACHE THAT CAN PROVIDE DATA FOR BACKGROUND DMA DEVICES WHILE THE PROCESSOR IS IN A LOW-POWER STATE.

BACKGROUND

1. Field

Advancements in microprocessor hardware prefetching are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

What is needed is a more effective way of implementing hardware prefetching.

SUMMARY

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Illustrative Combinations that tersely summarize illustrative systems and methods in accordance with the concepts taught herein. As is discussed in more detail in the Conclusions, the invention encompasses all possible modifications and variations within the scope of the issued claims, which are appended to the very end of the issued patent.

DETAILED DESCRIPTION

A detailed description of one or more embodiments of the invention is provided below along with accompanying figures that illustrate the principles of the invention. The invention is described in connection with the embodiments, which are understood to be merely illustrative and not limiting. The invention is expressly not limited to or by any or all of the embodiments herein. The scope of the invention is limited only by the claims of the issued patent and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification.

In some embodiments software hints (produced during program compilation, for example) embedded in various combinations of prefetch hint instructions or prefixes (or both) guide operations of one or more hardware prefetch units, leading to improved hardware prefetching with reduced hardware cost. The hint may specify a memory reference pattern to search for, and may be accompanied by one or more parameters to guide prefetching when the specified pattern is detected. In some embodiments the hints are used in conjunction with control registers that provide additional suggestive information. According to various embodiments a software agent assembles the hint instructions and hint prefixes including optional parameters associated with the hints. The parameters serve to assist (in some embodiments) or to more directly control (in other embodiments) prefetch behavior with regard to traffic patterns to prefetch for, when to start (and stop) prefetching, and how aggressively to prefetch.

Illustrative Combinations

This introduction concludes with a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims.

A first illustrative combination of a method including the steps of: prefetching memory locations in response to a determination of a match between a series of addresses and a generated traffic pattern; and wherein the series of addresses is specified by a prefetch hint included in an executable representation of a computer program that when executed produces the generated traffic pattern.

A second illustrative combination of a method including the steps of: determining a prefetch hint specifying a progression of addresses to search for during execution of a program; including the prefetch hint in an executable representation of the program; wherein the prefetch hint is compatible with processing by a hardware prefetcher included in a processor capable of executing the executable representation; and wherein the hardware prefetcher is enabled to detect a match between generated addresses and the progression of addresses, the generated addresses being addresses resulting from processing memory reference instructions during the executing.

The second illustrative combination wherein the progression of addresses includes at least one of a non-hint progression, a one-dimensional stride, a two-dimensional stride, a multi-dimensional stride, an indirect-stride, and a progression of indirect references.

The second illustrative combination wherein the executable representation is included in object code. The foregoing illustrative combination wherein the program is represented by at least one of assembler and a high-level language. The foregoing illustrative combination wherein the high-level language includes at least one of C, Pascal, and Fortran.

The second illustrative combination wherein the determining includes recognizing an iteration construct. The foregoing illustrative combination wherein the iteration construct includes a loop accessing a variable stored in memory according to a function of an iteration value of the loop. The foregoing illustrative combination wherein the prefetch hint specifies a stride reference progression. The foregoing illustrative combination wherein the prefetch hint specifies a count of prefetches to perform.

The second illustrative combination wherein the determining includes recognizing a conditional iteration specification. The foregoing illustrative combination wherein the conditional iteration specification specifies a loop conditionally accessing a variable stored in memory. The foregoing illustrative combination wherein a prefetch directive specifying the progression of addresses is included in the executable representation and is compatible with directing the hardware prefetcher to cease prefetching according to the progression of addresses.

The second illustrative combination wherein the prefetch hint further specifies a parameter. The foregoing illustrative combination wherein the parameter is associated with the progression of addresses. The foregoing illustrative combination wherein the parameter modifies the detection. The foregoing illustrative combination wherein the modification includes at least one of matching zero detections, matching a single detection, matching a plurality of detections, recognizing a sub-pattern, and filtering based on a memory address range. The foregoing illustrative combination wherein the memory address range is specified in part by a portion of the prefetch hint.

The second illustrative combination wherein the hardware prefetcher is further enabled to prefetch after the match is detected. The second illustrative combination wherein the hardware prefetcher is further enabled to prefetch in response to the match. The foregoing illustrative combination wherein the prefetch is in accordance with a parameter. The foregoing illustrative combination wherein the parameter specifies at least one of a maximum number of prefetches, an absolute prefetch importance, a relative prefetch importance, an absolute prefetch rate, a relative prefetch rate, and a prefetch onset rate.

A third illustrative combination of a method including the steps of: storing a parameter; searching addresses generated by execution of an executable representation of a program for a sequence based at least in part on the parameter; wherein the parameter is at least one of a pattern of memory references, a number of pattern matches, and a memory reference address; and wherein the parameter is conveyed by a prefetch hint included in the executable representation.

The third illustrative combination wherein the pattern of memory references includes at least one of a non-hint pattern, a one-dimensional stride, a two-dimensional stride, a multi-dimensional stride, an indirect-stride, and an indirect reference.

The third illustrative combination wherein the storing is directed to a memory of patterns. The third illustrative combination wherein the storing is directed to a register. The foregoing illustrative combination wherein the register is writable by an instruction included in the executable representation. The foregoing illustrative combination wherein the register is implemented via a model-specific register.

The third illustrative combination further including in response to an event, freeing space used by the storing. The foregoing illustrative combination wherein the event includes at least one of expiration of a predetermined time interval, expiration of a programmed time interval, and interpretation of a prefetch command included in the executable representation. The foregoing illustrative combination wherein the prefetch command specifies the pattern of memory references. The foregoing illustrative combination wherein the programmed time interval is specified by a register writable by an instruction included in the executable representation. The foregoing illustrative combination wherein the register is implemented via a model-specific register.

The third illustrative combination further including in response to a prefetch command included in the executable representation, reducing a prefetch rate associated with the pattern of memory references. The foregoing illustrative combination wherein the prefetch command specifies the pattern of memory references.

The third illustrative combination further including initializing state associated with the pattern of memory references to a first state and then transitioning the state to a second state in response to the searching finding a match. The foregoing illustrative combination further including after the transitioning, prefetching according to the pattern of memory references.

The third illustrative combination further including prefetching according to the pattern of memory references. The foregoing illustrative combination further including determining the parameter. The foregoing illustrative combination wherein the determining is included in compiling the program into the executable representation.

Any of the first through third illustrative combinations, wherein the prefetch hint is at least one of a dedicated prefetch hint instruction, a prefetch hint prefix, and a prefetch parameter included in a memory reference instruction. The foregoing illustrative combination wherein the memory reference instruction is at least one of a load instruction, a store instruction, a load-store instruction, a load-operate instruction, an operate-store instruction, and a load-operate-store instruction.

Any of the first through third illustrative combinations, wherein the prefetch hint affects a single memory reference instruction. The foregoing illustrative combination wherein the prefetch hint is conveyed at least in part as a prefix associated with the single memory reference instruction. The foregoing illustrative combination wherein the prefix is a first prefix and the prefetch hint is further conveyed as a second prefix associated with the single memory reference instruction.

Any of the first through third illustrative combinations, wherein the prefetch hint affects a plurality of memory reference instructions. The foregoing illustrative combination wherein the prefetch hint is conveyed at least in part via a dedicated prefetch hint instruction. The foregoing illustrative combination wherein the dedicated prefetch hint instruction is a first dedicated prefetch hint instruction and the prefetch hint is further conveyed via a second dedicated prefetch hint instruction.

Any of the first through third illustrative combinations, wherein the prefetch hint is a first prefetch hint and affects following memory reference instructions until cancelled by a second prefetch hint. A fourth illustrative combination of a method including the steps of: including a prefetch command in an executable representation of a program; wherein the prefetch command is compatible with processing by a hardware prefetcher included in a processor capable of executing the executable representation; and wherein the prefetch command includes a directive to cease prefetching associated with a succession of memory references.

The fourth illustrative combination wherein the succession of memory references is specified by the prefetch command. The foregoing illustrative combination wherein the prefetch command overrides prefetch hints previously processed by the hardware prefetcher that specified the succession of memory references.

A fifth illustrative combination of a system including: a hint storage array; an access pattern recognizer coupled to the hint storage array; and wherein the hint storage array is enabled to record a plurality of prefetch hints, each of the prefetch hints describing a respective series of addresses to search for in a stream of addresses generated during execution of an object program having the prefetch hints embedded therein.

The fifth illustrative combination further including a memory unit enabled to provide the stream of addresses to the access pattern recognizer. The foregoing illustrative combination further including a hardware prefetcher enabled to prefetch according to at least one parameter provided by at least one of the prefetch hints. The foregoing illustrative combination further including a control register enabled to provide at least one control variable to the hardware prefetcher. The foregoing illustrative combination wherein the at least one control variable is at least one of a priority affecting the prefetch, a lifetime affecting the prefetch, and a range of memory addresses to filter the stream of addresses. The foregoing illustrative combination wherein the hint storage array is implemented in a microprocessor enabled to execute the object program. The foregoing illustrative combination wherein the microprocessor includes multiple core processing elements. The foregoing illustrative combination wherein the hardware prefetcher processes memory reference addresses generated by the multiple core processing elements.

The fifth illustrative combination wherein the access pattern recognizer is enabled to detect, within the stream of addresses, a set of accesses corresponding to a stride. The foregoing illustrative combination wherein the stride is conveyed by one of the prefetch hints. The foregoing illustrative combination wherein a representation of the stride is stored in the hint storage array. The foregoing illustrative combination wherein the stride is a first stride, the set of accesses is a first set of accesses, and the access pattern recognizer is enabled to detect a second set of accesses corresponding to a second stride. The foregoing illustrative combination wherein the sets of accesses corresponding to the first and the second strides are intermixed.

The fifth illustrative combination wherein the access pattern recognizer is capable of detecting, within the stream of addresses, a set of accesses corresponding to a pointer-directed reference. The foregoing illustrative combination wherein the access pattern recognizer is enabled to detect the pointer-directed reference via one of the prefetch hints. The foregoing illustrative combination wherein a representation of the pointer-directed reference is stored in the hint storage array. The foregoing illustrative combination wherein the pointer-directed reference is a first pointer-directed reference, the set of accesses is a first set of accesses, and the access pattern recognizer is enabled to detect a second set of accesses corresponding to a second pointer-directed reference. The foregoing illustrative combination wherein the sets of accesses corresponding to the first and the second pointer-directed references are intermixed. The foregoing illustrative combination wherein the pointer-directed references are indirect references.

The fifth illustrative combination wherein the search includes recognizing at least one of a sub-series address series, a one-dimensional address series, a two-dimensional address series, a multi-dimensional address series, and an indirect address series. The foregoing illustrative combination further including a sub-pattern recognizer coupled to the access pattern recognizer and enabled to detect an occurrence of the sub-series address series within at least one of the series of addresses.

The fifth illustrative combination further including a hardware prefetcher coupled to the access pattern recognizer. The foregoing illustrative combination wherein the access pattern recognizer is enabled to perform the search. The foregoing illustrative combination wherein in response to the access pattern recognizer detecting an occurrence of one of the series of addresses, the hardware prefetcher initiates prefetching according to the detected one of the series of addresses. The foregoing illustrative combination wherein the prefetching is according to at least one of a count, a ramp rate, and a priority communicated via the respective prefetch hint that described the detected one of the series of addresses.

A sixth illustrative combination of a system including: a hint storage array; an access pattern analyzer coupled to the hint storage array; wherein the access pattern analyzer is enabled to detect an occurrence of a memory access pattern within a series of accesses produced by execution of an executable representation of a program having a prefetch hint embedded therein; wherein a representation of the memory access pattern is stored in the hint storage array; and wherein the prefetch hint specifies the memory access pattern.

The sixth illustrative combination wherein the memory access pattern is at least one of a single-dimension stride access pattern, a multiple-dimension stride access pattern, an indirect-stride access pattern, and an indirect access pattern.

The sixth illustrative combination wherein the access pattern analyzer is a hint access pattern analyzer; and further including a non-hint access pattern analyzer. The foregoing illustrative combination wherein the memory access pattern is a hint memory access pattern and the non-hint access pattern analyzer is enabled to detect an occurrence of a non-hint memory access pattern within the series of accesses. The foregoing illustrative combination wherein the series of accesses includes at least one occurrence of the hint memory access pattern and at least one occurrence of the non-hint memory access pattern. The foregoing illustrative combination wherein elements of the series of accesses corresponding to the at least one occurrence of the hint memory access pattern are intermingled with elements of the series of accesses corresponding to the at least one occurrence of the non-hint memory access pattern.

The sixth illustrative combination further including a memory system enabled to respond to the series of accesses. The foregoing illustrative combination wherein the memory system is partially implemented in a microprocessor. The foregoing illustrative combination further including the microprocessor. The foregoing illustrative combination wherein the hint storage array and the access pattern analyzer are implemented in the microprocessor. The foregoing illustrative combination wherein the microprocessor implements at least one processing element. The foregoing illustrative combination wherein the microprocessor implements at least two processing elements. The foregoing illustrative combination wherein each of the processing elements includes a memory reference processing unit. The foregoing illustrative combination wherein each of the memory reference processing units is enabled to generate a respective portion of the accesses.

A seventh illustrative combination of a system including: a table; a memory reference analyzer coupled to the table and responsive to a first stream of memory addresses from a first memory access generator; a second memory access generator enabled to generate a second stream of memory addresses, the second memory access generator being coupled to the memory reference analyzer and responsive to a memory hierarchy promotion request; wherein the memory reference analyzer produces the memory hierarchy promotion request subject to a memory access pattern as specified by an entry in the table being detected in the first stream of memory addresses; and wherein the entry is produced in response to a memory hierarchy promotion directive embedded in an executable program. The foregoing illustrative combination wherein the table is a hint table.

The seventh illustrative combination further including the first memory access generator coupled to the memory reference analyzer and responsive to memory reference instructions included in the executable program.

The foregoing illustrative combination wherein the memory hierarchy promotion directive is at least one of a dedicated memory hierarchy promotion instruction, a memory hierarchy promotion prefix, and a memory hierarchy promotion argument compatible with one of the memory reference instructions. The foregoing illustrative combination wherein the one of the memory reference instructions is at least one of a load instruction, a store instruction, a load-store instruction, a load-operate instruction, an operate-store instruction, and a load-operate-store instruction.

The seventh illustrative combination wherein the memory hierarchy promotion request is a first memory hierarchy promotion request; and the second memory access generator is further enabled to generate a third stream of memory addresses in response to a second memory hierarchy promotion request. The foregoing illustrative combination wherein the memory access pattern is a first memory access pattern; the memory hierarchy promotion directive is a first memory hierarchy promotion directive; the entry is a first entry; and the second memory hierarchy promotion request is produced by the memory reference analyzer subject to a second memory access pattern as specified by a second entry in the hint table being detected in the first stream of memory addresses.

The seventh illustrative combination wherein the memory hierarchy promotion directive specifies a parameter referenced by the second memory access generator. The foregoing illustrative combination wherein the parameter is at least one of a maximum number of accesses, and an access generation level-of-service. The foregoing illustrative combination wherein data corresponding to at least some of the second stream of memory addresses is prefetched from main memory into a level of a cache hierarchy. The foregoing illustrative combination wherein at least a portion of the data is promoted within the cache hierarchy.

An eighth illustrative combination of a computer readable medium having a set of instructions stored therein which when executed by a processing element causes the processing element to perform steps including: selecting one of a plurality of a prefetch hints based on recognition of memory reference idiom; embedding the selected one of the prefetch hints into an executable representation of a source program that is compatible with execution on a processor, the execution producing at least memory traffic; and wherein the processor includes a hint pattern recognizer enabled to recognize a portion of the memory traffic corresponding to the selected one of the prefetch hints.

The eighth illustrative combination wherein the memory reference idiom is a first memory reference idiom and further including analyzing the source program to recognize a second memory reference idiom. The foregoing illustrative combination further including selecting another one of the prefetch hints based on the second memory reference idiom. The foregoing illustrative combination wherein the first memory reference idiom is an array access. The foregoing illustrative combination wherein the one of the prefetch hints is a stride access hint. The foregoing illustrative combination wherein the second memory reference idiom is an access via a pointer. The foregoing illustrative combination wherein the another one of the prefetch hints is an indirect access hint.

The eighth illustrative combination wherein the processor further includes a memory prefetcher responsive to the hint pattern recognizer. The foregoing illustrative combination wherein the memory prefetcher is enabled to prefetch locations from a memory array into a cache memory. The foregoing illustrative combination wherein the cache memory is implemented in a microprocessor that includes the hint pattern recognizer. The foregoing illustrative combination wherein the microprocessor is a multi-core microprocessor.

The eighth illustrative combination wherein the steps are implemented as part of a compiler. The foregoing illustrative combination wherein the source program includes a portion in at least one of C, Pascal, Fortran, and assembler.

System

Figure 1:
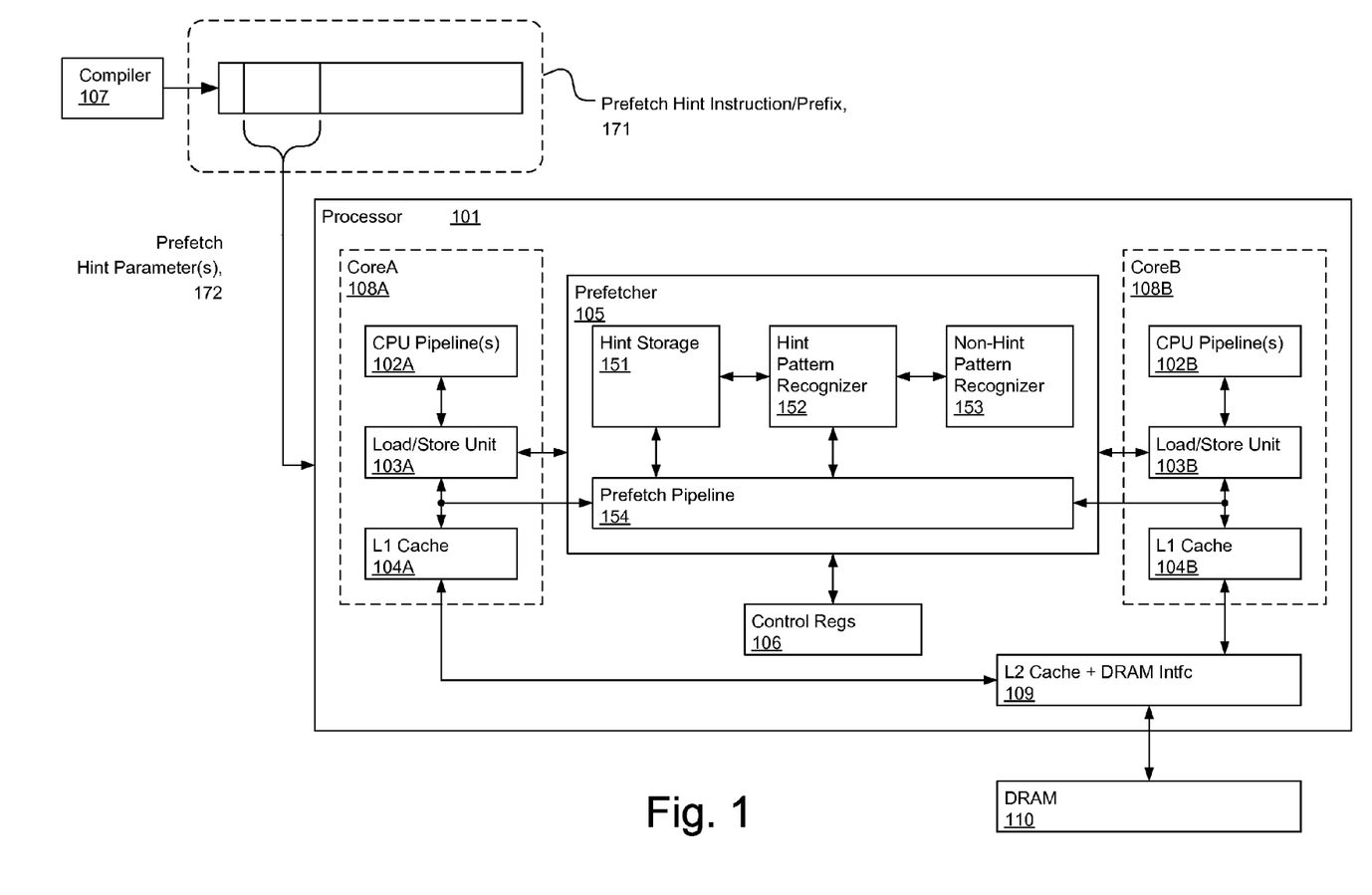
FIG. 1 illustrates selected details of an embodiment of a system providing prefetch hints via instructions and/or prefixes to guide processing of a hardware prefetcher.

FIG. 1 illustrates selected details of an embodiment of a system providing prefetch hints via instructions and/or prefixes to guide processing of a hardware prefetcher. Compiler 107 analyzes source code and produces object code including one or more prefetch hint instructions or prefetch hint prefixes (such as Prefetch Hint Instruction/Prefix 171). The prefetch hint instruction/prefix may optionally include one or more informational values (such as Prefetch Hint Parameter(s) 172). The object code is executed by Processor 101. The processor includes two processing elements CoreA 108A and CoreB 108B. Each core includes respective CPU Pipeline(s) (102A-B), a Load/Store Unit (103A-B), and an L1 Cache (104A-B) to process instructions specified by the object code. The L1 caches are coupled to shared L2 Cache and DRAM Interface unit 109, that is in turn coupled to Dynamic Randomly Accessible read/write Memory (DRAM) 110 external to the processor. The load/store units process memory reference instructions, accessing the respective first level cache and communicating data between the respective CPU pipelines and the respective first level cache. The prefetch pipeline acts in conjunction with the load/store units and the first level caches to promote memory elements from the second level cache and/or the DRAM according to various prefetch requirements. The memory elements may be promoted from the DRAM to any of the first and second level caches, and may be promoted from the second to any of the first level caches, according to various embodiments.

The illustrated memory system of the first and second level caches, the DRAM interface, and the DRAM is representative of interfaces to and selected portions of a variety of memory system embodiments. Those of ordinary skill in the art will recognize that portions of the memory system may be implemented external to the processor (such as relatively high-capacity memory arrays, e.g. DRAM 110) and portions of the memory system may be implemented internal to the processor (such as relatively low-capacity but high-speed cache arrays, e.g. L1 Caches 104A-B and L2 Cache and DRAM Interface unit 109).

The processor further includes Prefetcher 105 and Control Registers 106 to process prefetch hint instructions (and prefixes) specified by the object code, including responding to any provided hint parameters. The prefetcher includes Hint Storage unit 151, Hint Pattern Recognizer 152, Non-Hint Pattern Recognizer 153, and Prefetch Pipeline 154. The hint storage unit stores prefetch hint instructions/prefixes (or representations thereof) and any associated parameters as necessary for proper processing of the hints. The hint pattern recognizer, using stored hint information from the hint storage unit, identifies a memory reference traffic pattern by examining a short list of recent memory accesses and finding a match to one of a plurality of traffic patterns. The non-hint pattern recognizer, operating without any hint information, searches for a recognizable traffic pattern in recent memory accesses. The prefetch pipeline acts on prefetch control information provided by the pattern recognizers to issue prefetches according to a recognized pattern after the pattern is detected. The prefetch pipeline also responds to prefetch information provided by the hint storage (such as behavior-modifying information provided as hint parameters).

In some embodiments operation of the prefetcher is segregated according to the core that processes a respective hint instruction (or prefix). In other words, if CoreA processes a first prefetch hint instruction, then the prefetcher performs pattern recognition as specified by the first prefetch hint instruction according to accesses generated by Load/Store Unit 103A and promotes to L1 Cache 104A or the L2 Cache (but not L1 Cache 104B). Further, if CoreB processes a second prefetch hint instruction, then the prefetcher performs recognition as specified by the second prefetch hint instruction according to accesses generated by Load/Store Unit 103B and promotes to L1 Cache 104B or the L2 Cache (but not L1 cache 104A). In some embodiments operation of the prefetch is not segregated, but rather shared. In other words, if either core processes a prefetch hint instruction, then accesses generated by both load/store units are combined and processed as if generated by a single load/store unit. Further, promotions may be targeted to either or both of the L1 caches (in addition to the L2 cache).

Those of ordinary skill in the art will recognize that the partitioning of elements in the prefetcher and the processor is illustrative only, and not limiting. For example, all or portions of the hint and the non-hint pattern recognizers could be combined into a single unit. For another example, all or portions of the prefetcher could be implemented in any combination of the load/store units, the first level caches, and the second level cache and DRAM interface. Those of ordinary skill in the art will also recognize that although the processor is illustrated as implementing a pair of cores, other embodiments may implement only a single core, or more than two cores, and include various cache hierarchies sharing one or more prefetch pipelines.

For example, other realizations may include a single level of cache or three or more levels of cache (instead of the illustrated two levels of cache), with higher levels of the cache system, in some variants, shared by one or more of the cores. Furthermore the cores may be arranged in one or more complexes sharing portions of the cache hierarchy and individual cores or core complexes may share one or more prefetch pipelines. More specifically, embodiments may include one or more instances of a pair of cores sharing a second level cache, with the instances in turn sharing a third level cache. Other embodiments may include one or more instances of a single core having a single first level cache, with the instances in turn sharing a second level cache. Other embodiments may include one or more instances of a single core having integrated first and second level caches, with the instances in turn sharing a third level cache. See, for example, FIGS. 7A-7F of U.S. Non-Provisional application Ser. No. 11/351,058, filed Feb. 9, 2006, by Laurent R. Moll, et al.; and entitled A SMALL AND POWER EFFICIENT CACHE THAT CAN PROVIDE DATA FOR BACKGROUND DMA DEVICES WHILE THE PROCESSOR IS IN A LOW-POWER STATE, included by reference herein for all purposes, for examples of several core and cache hierarchy arrangements (the illustrated control elements may be considered representative of either or both of a prefetch pipeline and a DRAM interface). These and all similar variations are contemplated.

Strides

Figure 2:
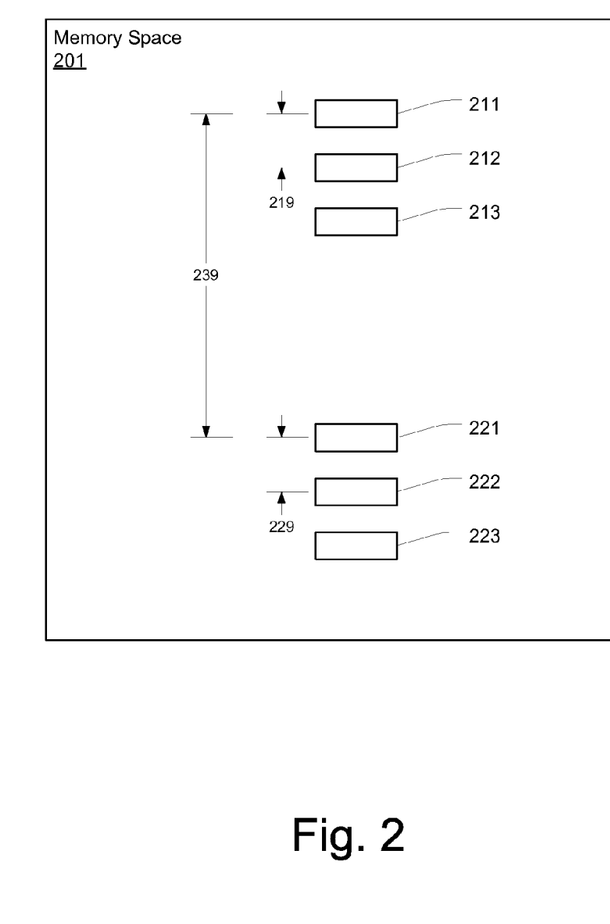
FIG. 2 illustrates memory elements of a memory space accessed according to a two-dimensional striding pattern.

FIG. 2 illustrates memory elements of Memory Space 201 accessed according to a two-dimensional striding pattern. Memory Elements 211-213 and 221-223 are members of a data structure, such as a two-dimensional array, accessed in a regular pattern, such as by columns and then by rows (when a column end is reached). Stride 219 is the difference in memory addresses between Memory Elements 211 and 212, and is representative of a first fixed address delta between an arbitrary number of elements of a first dimension of the data structure. Similarly Stride 229 is the difference in memory addresses between Memory Elements 221 and 222, and may be identical to Stride 219. Stride 239 is the difference in memory addresses between Memory Elements 211 and 221, and is representative of a second fixed address delta between an arbitrary number of elements of a second dimension of the data structure. An example access pattern is 211, 212, and 213 followed by 221, 222, and 223, when the first dimension is three. Another example access pattern is 211 and 212 followed by 221 and 222 followed by 213 and so forth, when the first dimension is two.

Traffic Patterns and Hints

The hints provide information with respect to a variety of traffic patterns, including: one/two/N-dimensional strides, indirect references, and modifiers such as sparse and region. Various parameters (implemented, for example, as one or more fields) including a count field, a priority field, and a ramp field may also be provided by the information.

A one-dimensional stride hint is provided for patterns where memory locations are accessed in a sequence where two locations accessed consecutively are separated by a fixed interval. The one-dimensional stride hint provides an interval (or stride) size as a parameter. A two-dimensional stride hint is provided for patterns where memory locations are accessed following a two-dimensional pattern of the form (offset+n*A-stride+m*B-stride) where n and m increase sequentially in nested loops. With respect to FIG. 2, A-stride would be Stride 219 and B-stride would be Stride 239. The two-dimensional stride hint provides two parameters, corresponding to the A-stride and B-stride values. An N-dimensional-stride hint is provided for patterns having array accesses that are not limited to one or two dimensions. The N-dimensional stride hint provides N parameters, corresponding to the various strides associated with the dimensions of the array accesses. An indirect reference hint is provided for patterns where contents of a recent memory access are used to compute an address that is referenced subsequently. For example, when address A is accessed, address memory(A)+offset is accessed subsequently. The indirect reference hint provides a delta to the next address (with respect to the previous address) as a parameter.

In some embodiments stride-directed and indirect hints may be used together to effect efficient processing of more complex traffic patterns. For example, prefetching of data at the target of an array of pointers separated by regular intervals may be performed.

Stride-directed and indirect hints may be combined with modifiers including sparse and region. The sparse modifier is provided to direct prefetching to attempt to identify a sub-pattern within the hinted pattern and prefetch according to the sub-pattern rather than prefetching according to the entire pattern. Use of the sparse modifier enables easier hardware recognition of complex patterns, such as sparse accesses through a multidimensional array. The region modifier is provided to link a pattern to a memory region, such as a range of addresses.

In some embodiments the (optionally modified) stride-directed and indirect hints immediately enable prefetching according to the respective hint, i.e. prefetching "starts" upon recognition of an access pattern matching the hinted pattern. In some embodiments a complementary set of hints immediately disable the corresponding type of prefetching, i.e. prefetching "stops" upon processing of the hint. For example, in response to a one-dimensional stride pattern match, prefetching according to the provided stride begins and subsequently, in response to a stop-one-dimensional stride hint, the one-dimensional prefetching ceases.

Modifiers

In some embodiments additional modifiers or parameters may alter or guide operations performed by prefetching hardware. The additional modifiers/parameters may be passed in various combinations. For example, a single modifier or a pair of modifiers may be used together. Various embodiments may implement various combinations of processing of the modifiers, according to implementation requirements. The additional modifiers/parameters include a count field that may be provided (passed, for example, as an immediate value or as a value in a register) by a hint instruction/prefix, instructing the prefetcher as to how many times a pattern is to be prefetched. In some embodiments a prefetch stop hint negates any outstanding prefetch counts originating from a count hint field. A priority field may be provided (passed as an immediate or a value in a register, for example) by a hint instruction/prefix, instructing the prefetcher as to a required prefetching rate, relative priority, absolute priority, or similar level of service description. A ramp field may be provided (as an immediate or a registered value, for example) by a hint instruction/prefix, instructing the prefetcher as to how quickly or aggressively to detect the associated pattern. For example, the ramp field may specify detection of zero, one, two, or three, and so forth occurrences of the associated pattern before the pattern is considered to be active and prefetching according to the pattern begins.

In some embodiments a prefetch hint may be optionally specified as an instruction or prefix to be applied to following instructions indefinitely, subject to an optional count modifier and a stop hint. In some embodiments a prefetch hint may be optionally specified as an instruction or prefix to be applied to a first single memory reference instruction dynamically following the hint according to the program order (referred to as a "single instruction" prefetch hint). When processing a single instruction prefetch hint, an indeterminate number of non-memory-reference instructions may be processed between the hint and the memory reference and the hint will still be applied to the memory reference. In some embodiments a prefetch hint may be implemented as an instruction prefix applied to a single immediately following memory reference instruction, and has no direct effect on any other memory reference instructions.

Hints may be combined by providing additional information in a single hint instruction or prefix. For example, a one-dimensional and sparse hint may be provided as one instruction. Combining may also be specified by providing the additional information in a following second hint instruction or prefix. For an alternate example, the one-dimensional and sparse hint may be provided as two prefixes, the first being a one-dimensional hint prefix, and the second being a sparse hint prefix.

Hint information may be specified directly (such as an immediate value) or indirectly by reference (such as a register identifier) in a hint instruction or prefix, or combined with a memory reference instruction such as a load. For example, a load instruction may include a prefetch hint field. The field may be used to specify any one of a stride-directed prefetch hint (an offset specified in the address calculation for the load is the stride), an indirect prefetch hint (the load value is a pointer), or a "no prefetch" prefetch hint. The field may be encoded directly in the memory reference instruction or specified by one or more prefixes associated with the memory reference instruction.

Operation

Figure 3:
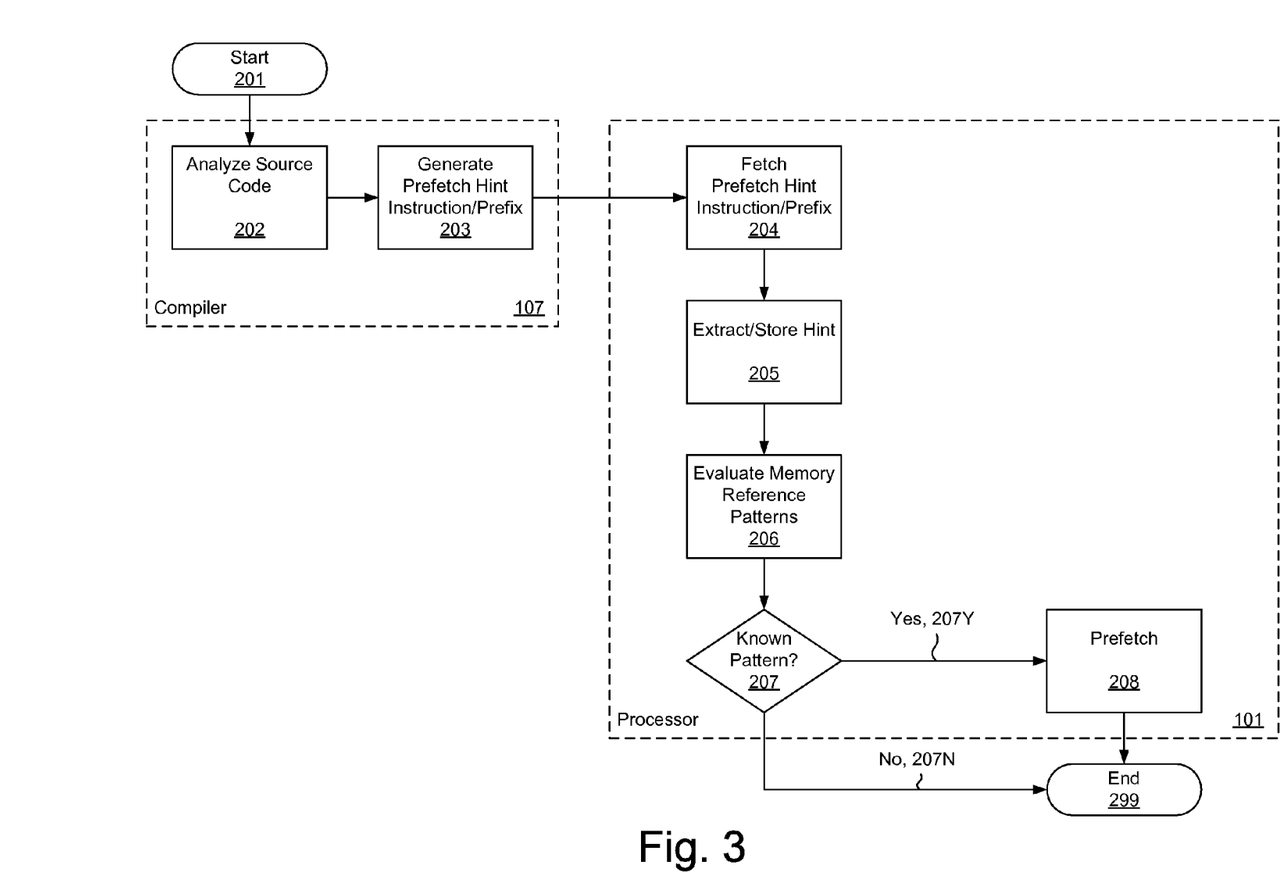
FIG. 3 illustrates selected aspects of operation of an embodiment of a system providing and processing prefetch hints.

FIG. 3 illustrates selected aspects of operation of an embodiment of a system providing and processing prefetch hints, such as operations performed by Compiler 107 and Processor 101 of FIG. 1, including processing source code to object code having a prefetch hint instruction (or prefix) and subsequent execution of the object code by either or both of CoreA-B 108A-B. The illustration is representative of compiler operations relating to recognizing a single memory reference pattern and producing a corresponding hint, and is repeated as necessary for a plurality of memory reference patterns and respective hints. The illustration is further representative of processor operations relating to each hint and dynamic evaluation of memory address patterns resulting from execution of memory reference instructions with respect to the hints, followed by any triggered prefetches. In some usage scenarios processing performed by the compiler may be substantially separated in time with respect to functions performed by the processor. In some implementations functions performed by the processor may be wholly or partially overlapped (i.e. performed somewhat in parallel) for more than one hint or more than one memory reference instruction. The source code may vary by implementation, and may take forms including any combination of assembler, high-level language (such as C, Pascal, Fortran, and so forth), and other representations of programmed functionality.

Flow begins via Compiler 107 at ("Start" 201) and proceeds to parse source code ("Analyze Source Code" 202) to determine appropriate instructions to produce for execution by an execution vehicle (such as Processor 101) to perform functions described by the source code. Compiler 107 analyzes source code and recognizes any one of a plurality of memory reference patterns that are supported by Prefetcher 105 in part via prefetch hint information such as provided by Prefetch Hint Instruction/Prefix 171 and optionally including values such as Prefetch Hint Parameter(s) 172. Then an appropriate hint instruction (or prefix, according to usage scenario or embodiment) is determined and produced corresponding to the memory reference pattern ("Generate Prefetch Hint Instruction/Prefix" 203), in part based on the analyzed context. For example, the compiler may recognize a loop with a fixed number of iterations and embed a hint instruction/prefix with corresponding count field information. For another example, the compiler may recognize a conditional loop and include a hint stop instruction/prefix around areas where selected reference patterns are active or on specific memory instructions that are to be optimized.

The generated hint instruction (or prefix) includes information to guide hardware-based prefetching (such as Prefetch 105 of FIG. 1). The generated hint may also include additional prefetch control information to deliver to the prefetch unit (such as Prefetch Hint Parameter(s) 172 of FIG. 1). Object code for the hint is included with object code for other instructions (including other hints) as required according to the source code, and the object code is made available for execution. Note that in some usage scenarios compiling is performed on the same processor as resultant object code is executed on, and in some usage scenarios compiling and execution are performed on different computers and hence processors.

Having produced object code, flow related to the hint instruction (or prefix) then continues (perhaps substantially later in time) in Processor 101 (via either or both of CoreA-B 108A-B), beginning with retrieving the hint instruction for execution from memory, such as any combination of main memory, cache memory, and so forth ("Fetch Hint Instruction/Prefix" 204). Flow continues to ascertain prefetch information from the hint and retain the information for later use ("Extract/Store Hint" 205). For example, the extracted information may include any of start/stop, stride, two-dimensional stride, indirect, and indirect-stride directives and associated parameters.

Processing continues by monitoring addresses generated during execution of load and store instructions, by analyzing addresses from previously monitored instructions, or both ("Evaluate Memory Reference Patterns" 206). Hint Pattern Recognizer 152 (FIG. 1) examines a history of recent memory accesses (as generated by Load/Store Units 103A-B, for example) for any of the patterns stored by the hint storage unit. When a pattern is recognized ("Known Pattern?" 207 followed by "Yes" 207Y), then processing relating to prefetch begins ("Prefetch" 208). When prefetch processing is complete (due to a hint stop instruction/prefix, a hint being unused for a period of time, or hint storage overflow, for example), processing is complete ("End" 299). If no pattern is recognized ("Known Pattern?" 207 followed by "No" 207N), then there is no further processing ("End" 299).

The processing relating to prefetch begins when a pattern is recognized. The pattern is marked active and associated with memory instructions that generated references in the pattern. If the pattern was specified by a hint instruction/prefix with a single memory instruction hint option, then the pattern is marked active upon the first encounter of the memory instruction. If a sparse modifier was used when specifying the pattern, then the pattern is marked sparse. If a ramp hint was used when specifying the pattern, then the pattern is marked active after the specified number of occurrences has been detected. If no ramp hint was used, then the pattern is marked active after an implementation-dependent number of occurrences.

When a pattern is marked sparse or no pattern is used, then Non-Hint Pattern Recognizer 153 (FIG. 1) attempts to recognize patterns without hints. In the marked sparse operating context the non-hint pattern recognizer searches for a sub-pattern within the hinted pattern. For example, if a sparse two-dimensional stride hint is used, then the non-hint pattern recognizer assumes that accesses are according to the two-dimensional stride, and more easily recognizes two-dimensional indexing patterns. Consider a two-dimensional array A, having 7×100 elements, accessed sparsely by fetches from A(1,1), A(1,3) and A(1,6), followed by A(2,1), A(2,3), and A(2,6). The non-hint pattern recognizer may be enabled to recognize the sparse accesses and launch prefetches for A(3, 1), A(3,3), A(3,6), and so forth.

When a pattern is in the hint storage unit and has been recognized by any of the pattern recognizers, then when the address of an access falls into a region associated with a pattern, Prefetch Pipeline 154 (FIG. 1) launches prefetches according to the pattern. The prefetch pipeline may, in some usage scenarios or embodiments, use memory instructions associated with the pattern to ensure prefetches are limited in number. If a priority field is associated with the pattern, then the prefetch pipeline throttles prefetching according to the associated priority.

When a hint stop instruction/prefix is received or the prefetch count is reached, the hint is removed from the hint storage unit, the pattern is removed from the hint pattern recognizer, and no further prefetches are issued for the pattern. In some embodiments (such as some implementations lacking hint stop, count field, or both features) a hint is dropped (or removed) after a programmable time or when the hint storage unit lacks capacity for storing more hints. In some embodiments a least recently used technique is used to determine which hint to remove. In alternate embodiments a priority field associated with a pattern may be used to choose a hint to delete (such as removing a hint with a relatively low or the lowest priority). In some embodiments, instead of removing the hint from the hint storage unit, a priority associated with the hint is reduced. In some embodiments the reduction of the hint priority is according to a parameter associated with the hint (i.e. included with the hint instruction/prefix).

In some embodiments hint information may be provided according to or modified by configuration and mode settings implemented by Control Registers 106 (FIG. 1). For example, the programmable time associated with hint removal may be implemented by one of the control registers. For another example, addresses ranges associated with the region modifier may be implemented by a plurality of the control registers. Generally, any of the behaviors of the prefetcher may be controlled wholly or in part by state implemented in the control registers, according to various embodiments. In some embodiments all or portions of the control registers may be implemented via one or more Model Specific Registers (MSRs) that are accessible via either or both of CoreA-B 108A-B.

In some embodiments the prefetcher manages hint information in a manner and format identical to or closely resembling the prefetch hint information and parameters specified by an instruction. In some embodiments the prefetcher uses a more compact representation of all or portions of the information and parameters, such as converting information to cache line granular values. Various embodiments of the prefetcher may be implemented in conjunction with different processors having different respective cache line sizes, and thus the various prefetcher embodiments may represent information differently. In some embodiments the prefetcher determines physical cache lines to fetch.

Computing System

Figure 4:
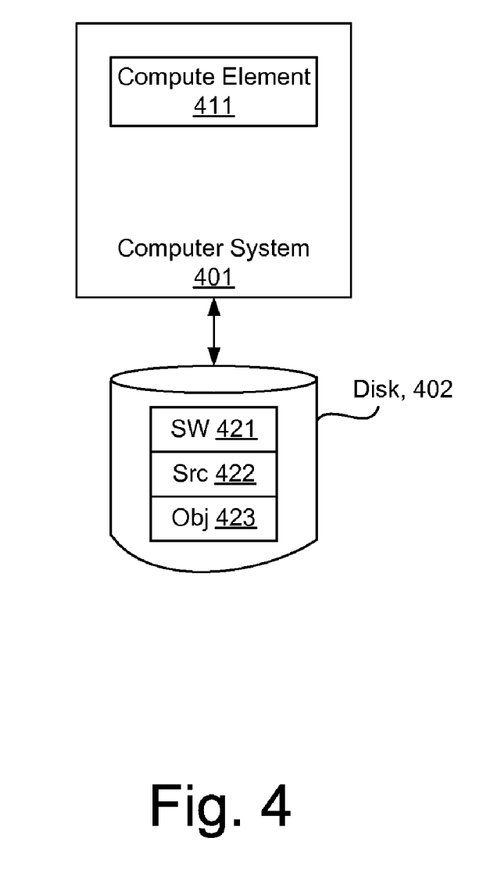
FIG. 4 illustrates selected details of an embodiment of a computing system to execute software routines to perform software determination of an appropriate prefetch hint instruction and/or prefix.

FIG. 4 illustrates selected details of an embodiment of a computing system to execute software routines to perform software determination of an appropriate prefetch hint instruction and/or prefix. The computing system includes Computer System 401 coupled to Disk 402. The computer system includes Compute Element 411 enabled to execute software routines made available from the disk as any portion of machine-readable executable files included in SoftWare (SW) image 421. The SW may include one or more implementations of any portion of Compiler 107 (of FIG. 1). In operation the SW is executed by the compute element and analyzes one or more program files such as Source Code (Src) 422. The SW generates instructions including one or more prefetch hint instructions (or prefixes) having respective embedded prefetch hint parameters. The generated instructions are stored as one or more object code files such as Object Code (Obj) 423. The object code is compatible with execution by an instruction processing element such as Processor 101 (of FIG. 1). In some embodiments Compute Element 411 is implemented by all or a portion of Processor 101.

CONCLUSION

Although the foregoing embodiments have been described in some detail for purposes of clarity of understanding, the invention is not limited to the details provided. There are many ways of implementing the invention. The disclosed embodiments are illustrative and not restrictive.

It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The names given to interconnect and logic are merely illustrative, and should not be construed as limiting the concepts taught. The order and arrangement of flowchart and flow diagram process, action, and function elements may generally be varied. Also, unless specifically stated to the contrary, the value ranges specified, the maximum and minimum values used, or other particular specifications (such as the number and type of prefetch hint instructions/prefixes; the number and type of parameters associated with prefetch hint instructions/prefixes; the number, width, and organization of fields in prefetch hint instructions/prefixes; and the number of entries or stages in registers and buffers), are merely those of the illustrative embodiments, may be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims appended to the issued patent.

What is claimed is:

1. A method for executing an executable representation of a computer program, the method including the steps of:

prefetching memory locations in response to identifying a match between a memory access pattern and a set of addresses forming a generated traffic pattern;

wherein the memory access pattern is explicitly specified by an address series search specification included in an executable representation of a computer program that when executed produces the generated traffic pattern; and wherein the address series search specification is at least one of
- a prefix associated with a first memory reference instruction,
- a dedicated address series search specification instruction, and
- a dedicated address series search specification field included in a second memory reference instruction.

2. The method of claim 1, wherein the memory reference instructions include at least one of:
- a memory read instruction,
- a memory write instruction,
- a memory read and write instruction,
- a memory read and execute instruction,
- an execute and memory write instruction, and
- a memory read, execute, and memory write instruction.

3. The method of claim 1, wherein the address series search specification describes at least one of:
- a sparse series,
- a stride series,
- a one-dimensional stride series,
- a two-dimensional stride series,
- a multi-dimensional stride series,
- an indirect-stride series, and
- an indirect series.

4. The method of claim 1, wherein the prefetching is in accordance with a prefetch control parameter specified by the address series search specification, the prefetch control parameter specifying at least one of a maximum number of prefetches, a prefetch priority, and a number of occurrences required to recognize the match.

5. The method of claim 1, wherein the prefetching memory locations is a first act of prefetching memory locations, the memory access pattern is a first memory access pattern, the address series search specification is a first address series search specification, and further including a second act of prefetching memory locations in response to identifying a match between a second memory access pattern and the set of addresses forming the generated traffic pattern, the second memory access pattern being specified by a second address series search specification included in the executable representation.

6. The method of claim 5, wherein the first and the second acts of prefetching memory locations are at least partially overlapped in time.

7. The method of claim 5, further including:
generating a first address of the generated traffic pattern; then
generating a second address of the generated traffic pattern; then
generating a third address of the generated traffic pattern; and
wherein the first and the third addresses are in accordance with the first address series search specification and the second address is in accordance with the second address series search specification.

8. A system including:
a storage array;
an access pattern recognizer coupled to the storage array;
wherein the storage array is enabled to record a plurality of pattern identifiers, each of the pattern identifiers specifying a respective series of addresses to search for in a stream of addresses, wherein the stream of addresses are generated during execution of an object program, and wherein the object program explicitly specifies the pattern identifiers embedded therein; and wherein the pattern identifiers are compatible with identifying at least one of:
- no pattern,
- a sparse pattern,
- a one-dimensional stride pattern,
- a two-dimensional stride pattern,
- a multi-dimensional stride pattern,
- a indirect-stride pattern, and
- an indirect pattern.

9. The system of claim 8, wherein the storage array and the access pattern recognizer are included in a microprocessor that is compatible with execution of the object program.

10. The system of claim 9, wherein the stream of addresses is in accordance with memory reference instructions specified by the object program.

11. The system of claim 10, wherein the microprocessor is enabled to execute the object program.

12. A system including:
a processor;
a table having a plurality of entries;
a memory reference analyzer coupled to the table and responsive to a first stream of memory addresses from a first memory access generator;
a second memory access generator enabled to generate a second stream of memory addresses, the second memory access generator being coupled to the memory reference analyzer and responsive to a memory hierarchy promotion request;
wherein the memory reference analyzer produces the memory hierarchy promotion request subject to a memory access pattern as specified by one of the entries of the table being detected in the first stream of memory addresses; and
wherein the one entry is produced in response to a memory hierarchy promotion directive embedded in an executable program, wherein the memory hierarchy promotion directive explicitly defines the memory access pattern.

13. The system of claim 12, further including the first memory access generator.

14. The system of claim 13, wherein the first memory access generator is enabled to process memory reference operations, the memory reference operations being in accordance with memory reference instructions included in the executable program.

15. The system of claim 14, wherein at least one of the memory reference instructions is a load instruction.

16. The system of clam 15, wherein execution of the load instruction by a microprocessor reads a memory location that is implemented by a memory array coupled to the microprocessor; and wherein the microprocessor includes the memory access generators.

17. The system of claim 12, wherein the second memory access generator is implemented by a prefetch circuit and the memory hierarchy promotion request is in accordance with a prefetch hint.

18. A computer readable storage medium having a set of instructions stored therein which when executed by a processing element causes the processing element to perform steps including:

selecting one of a plurality of a prefetch hints based on recognition of a memory reference idiom specified by a source program;

embedding the selected one of the prefetch hints into an executable representation of the source program, wherein the selected one of the prefetch hints explicitly defines a memory access pattern, the executable representation being compatible with execution on a processor, the execution producing at least memory traffic; and wherein the processor includes a hint pattern recognizer enabled to recognize a portion of the memory traffic matching the memory access pattern.

19. The computer readable storage medium of claim 18, wherein the memory reference idiom is a first memory reference idiom and the selected one of the prefetch hints is a first selected prefetch hint; and the steps further include embedding a second selected prefetch hint into the executable representation based on recognition of a second memory reference idiom in the source program.

20. The computer readable storage medium of claim 19, wherein the first memory reference idiom is an array access and the first selected prefetch hint is a stride access hint.

21. The computer readable storage medium of claim 20, wherein the second memory reference idiom is an access via a pointer and the second selected prefetch hint is an indirect access hint.

22. The computer readable storage medium of claim 18, wherein the source program is at least partially specified by a computer programming language compatible with at least one of C, Pascal, Fortran, and assembler.

* * * * *